United States Patent [19]

Sakuma et al.

[11] Patent Number: 4,586,782
[45] Date of Patent: May 6, 1986

[54] LASER BEAM OPTICAL SYSTEM WITH INCLINED CYLINDRICAL LENS

[76] Inventors: Nobuo Sakuma, 1283, Higashinaganuma, Inagi-shi, Tokyo; Yutaka Kaneko, 6-15-305, Haramachi, Isogo-ku, Yokohama-shi, Kanagawa-ken, both of Japan

[21] Appl. No.: 489,935

[22] Filed: Apr. 29, 1983

[30] Foreign Application Priority Data

May 1, 1982 [JP] Japan .................................. 57-73870
May 1, 1982 [JP] Japan .................................. 57-73871

[51] Int. Cl.⁴ .......................................... G02B 26/10
[52] U.S. Cl. ...................... 350/6.5; 350/433; 350/446
[58] Field of Search ................ 350/6.1–6.91, 350/433, 571, 446; 219/121 LP, 121 LQ, 121 LR, 121 LV, 121 LW

[56] References Cited

U.S. PATENT DOCUMENTS

| | | | |
|---|---|---|---|
| 3,972,584 | 8/1976 | Lobb | 350/571 |
| 4,080,633 | 3/1978 | Starkweather | 358/293 |
| 4,090,775 | 5/1978 | Lobb | 350/571 |
| 4,226,500 | 10/1980 | Minoura et al. | 350/6.8 |
| 4,248,495 | 2/1981 | Minoura | 350/6.8 |

*Primary Examiner*—Jon W. Henry
*Attorney, Agent, or Firm*—Guy W. Shoup

[57] ABSTRACT

A laser beam optical system used under the condition that an optical axis of a lens is arranged to be inclined with respect to an incident laser beam, and an effective focal length of the lens is made shorter than a focal length with respect to an on-axis light beam. A mirror lens with one surface designed as a plane reflective mirror is used for ease of manufacture. In addition, if the mirror lens is used as a cylindrical lens for the photodeflector of the system, the lens surface can be directed downwardly to remove a ghost image and prevent accumulation of dust.

7 Claims, 13 Drawing Figures

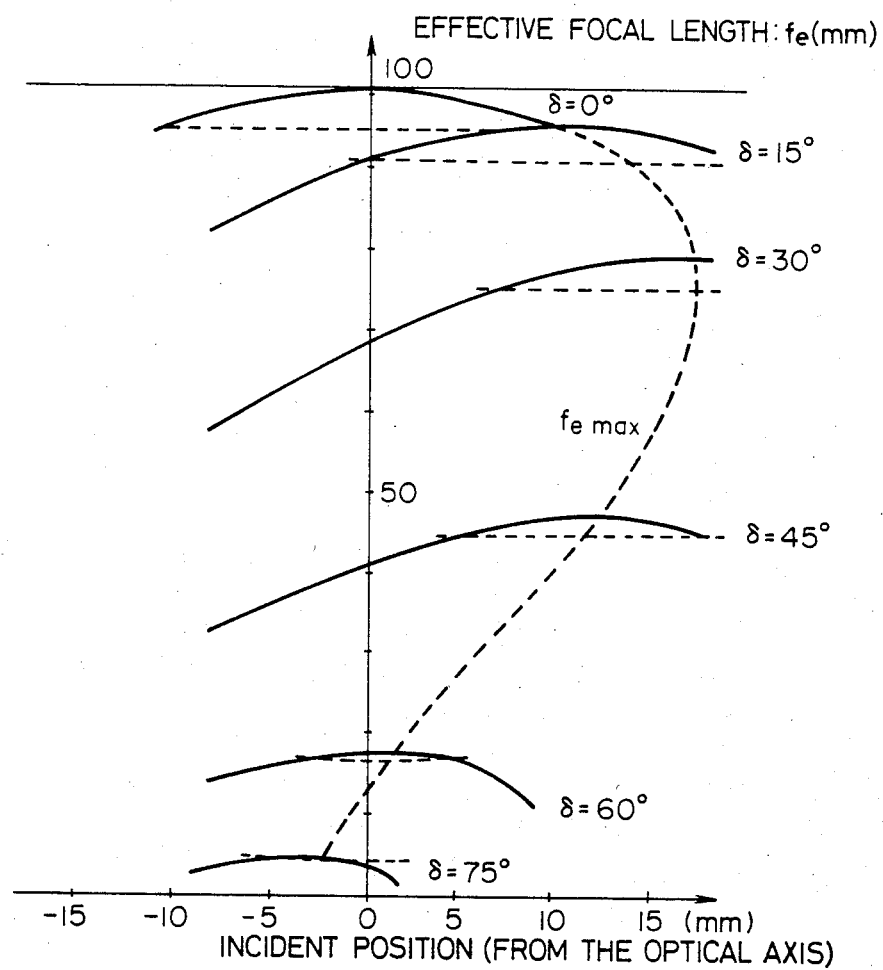

FIG. 11
(a) 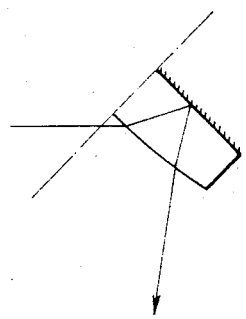
(b) 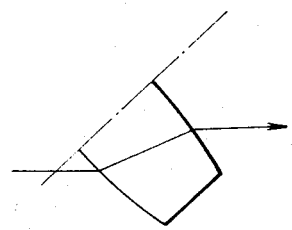
FIG. 12
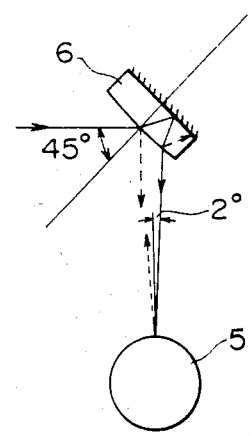
FIG. 13
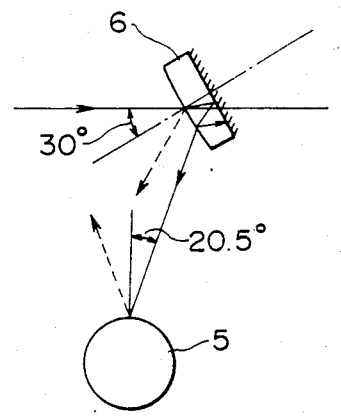

LASER BEAM OPTICAL SYSTEM WITH INCLINED CYLINDRICAL LENS

BACKGROUND OF THE INVENTION

1. Field of the Invention

The present invention relates to an improvement in an optical system of a photoscanner, and particularly, in an optical system having a fall-correction function for a rotary mirror or the like, and an optical system arrangement which can make the effective radius of curvature of lenses used large and which can prevent generation of a ghost image.

2. Description of the Prior Art

Photowriting apparatus for scanning with a laser beam on a photosensitive body are known to use a photodeflector such as a rotary polyhedral mirror, a hologram scanner and the like, an image forming element such as an fθ lens and the like, and a correction optical system for correcting so-called face-fall errors resulting from irregularities of the deflecting elements such as a fall error of each mirror face of the rotary polyhedral mirror, a deviation in position or eccentricity of a hologram of a hologram scanner.

FIG. 1 shows one example of a well known optical system as described above. A rotary polyhedral mirror is used as a photodeflector (light source not shown).

A gas laser or a semiconductor laser is used as a light source as is known. In case of a gas laser, a laser beam emitted from the light source is modulated by a modulator such as AOM and formed into a suitable beam diameter by a beam expander or the like. On the other hand, in case of a semiconductor laser, a laser beam modulated and emitted is formed into a suitable beam diameter by a coupling optical system or a shaping optical system. These beams are incident upon a rotary polyhedral mirror 1 by a first anamorphic optical system, in the form of an elongated elliptic beam having a long axis nearly perpendicular to the rotary axis thereof.

A laser light flux deflected by the rotation of the rotary polyhedral mirror 1 is formed on a photosensitive body 5 by means of an fθ lens 2 and is subjected to uniform scanning.

In the aforesaid optical system having a face-fall correcting function, as shown in a light path view of FIG. 2 in a so-called sub-scanning direction perpendicular to the scanning direction of the aforesaid laser beam, there is arranged a second cylindrical lens 4, and the rotary polyhedral mirror 1 and photosensitive body 5 are in a geometrically conjugated relation with the cylindrical lens 4 and fθ lens 2. With this, even if the laser beam should be deviated as indicated by the dotted lines by the face-fall of the mirror face 1, the spot position on the photosensitive body is kept constant to prevent occurrence of irregularity in the pitch of a scanning line.

In the drawing, a reference numeral 3 designates a plane mirror which is provided to refract the light path so as to permit the laser beam to be incident upon from the top of the photosensitive body 5.

In such a laser optical system, in practical use by means of a laser printer or the like, there is a tendency that lenses of short focal length are often used for miniaturization of the devices. Especially, cylindrical lenses used in the scanning optical system are often flat convex and flat concave lenses due to the limitation in manufacture. In addition, a material having low refractive index is generally used, and therefore, the radius of curvature used tends to be smaller and the volume productivity of manufacture is harder to obtain. For example, for lengthy cylindrical lenses having a length of from 200 to 300 mm and a width of from 15 to 20 mm, four lenses at the most are obtained by simultaneous manufacture when the radius of curvature is 20 mm, while if the radius of curvature is 40 mm, the number of lenses which can be obtained by simultaneous manufacture increases to about three times thereof.

Moreover, in the optical arrangement as described above, dust and toner entered are accumulated on the second cylindrical lens, not only resulting in the lowering of permeability but also the generation of white streaks caused by the accumulated matter on the copy in a sub-scanning direction due to the uneven accumulation. In addition, in this arrangement, the reflected light from the surface of the second cylindrical lens 4 and the scattered reflected light from the surface of the photosensitive body 5 are returned to the rotary polyhedral mirror 1 and reflected again to generate white streaks which result in a stationary ghost image on the photosensitive body 5.

SUMMARY OF THE INVENTION

In an optical system which handles small diameter beams such as laser beams, the effect of deterioration in performance of the optical system resulting from a spherical aberration or the like is less than a general optical system.

In the present invention, the above-described characteristics of the laser beam optical system are utilized and the property is used in which the effective focal length with respect to small diameter beams obliquely incident upon a spherical surface is shorter than the focal length with respect to the on-axis beam thereby allowing the radius of curvature of lens used to be larger to improve the volume productivity.

In addition, the present invention provides an optical system in which the above-described plane mirror 3 and second cylindrical lens 4 are formed into a single cylindrical mirror lens, thereby overcoming the disadvantages noted above.

BRIEF DESCRIPTION OF THE DRAWINGS

FIGS. 5 and 6 are respectively a sectional view of a lens according to one embodiment of the present invention and a curve showing the change of an effective focal length thereof;

FIG. 11 is a sectional view of a lens according to a still further embodiment;

FIG. 12 is a view of a light path of an essential portion of one embodiment of a scanner in accordance with the present invention; and FIG. 13 is a view of a light path of an essential portion of another embodiment.

DETAILED DESCRIPTION OF THE PREFERRED EMBODIMENTS

The preferred embodiments of the present invention will now be described in detail with reference to the drawings.

Figure 1:
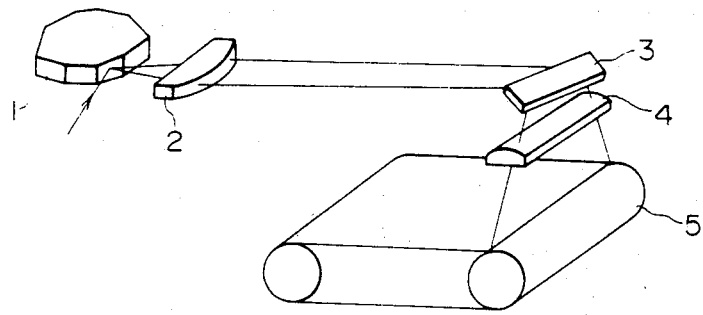
FIG. 1 is a perspective view of an essential portion of a well known photoscanner.
Figure 2:
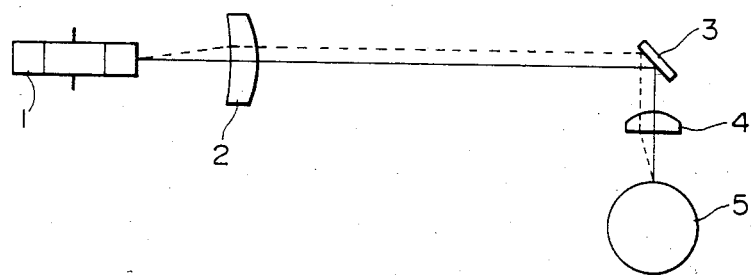
FIG. 2 is a view of a light path in a sub-scanning direction.
Figure 3:
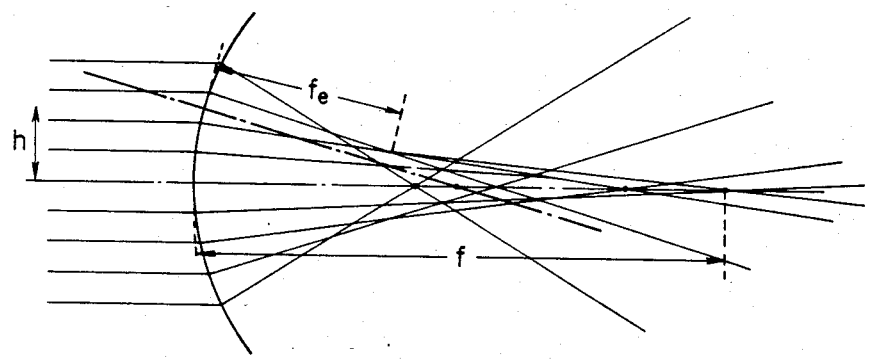
FIGS. 3 and 4 are views for explanation of a principle of the present invention.

FIG. 3 is a view for explanation of a principle of the present invention. A well known converging action of light by a spherical refractive surface is shown. An effective focal length $f_e$ with respect to a small diameter beam which is incident a length h away from the optical axis is shorter than a focal length f with respect to a light flux at a shorter length from the axis. It is noted that as the length h from the optical axis increases, the converging condition owing to the spherical aberration grows more serious, but in case the beam diameter is small, an effect thereof is small.

Figure 4:
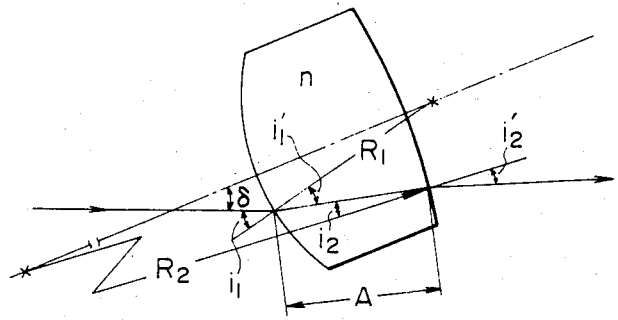

This is also true for the lens. Referring to FIG. 4, let $i_1$ and $i'_1$ be the incident angle and the refractive angle, respectively, to a first surface of a radius of curvature $R_1$, $i_2$ and $i'_2$ be the incident angle and the refractive angle to a second surface of a radius of curvature $R_2$, n be the refractive index, and A be the length of a geometrical light path, then the effective focal length is given by the following formula:

$$\frac{1}{f_e} = \frac{1}{R_1}\left(\frac{n}{\cos i_1} - \frac{1}{\cos i'_1}\right)\frac{\cos i_2}{\cos i'_2} +$$

$$\frac{1}{R_2}\left(\frac{1}{\cos i_2} - \frac{n}{\cos i'_2}\right)$$

$$\frac{\cos i'_1}{\cos i_1} - \frac{A}{nR_1R_2} -$$

$$\left(\frac{n}{\cos i_1} - \frac{1}{\cos i'_1}\right)\left(\frac{1}{\cos i_2} - \frac{n}{\cos i'_2}\right)$$

In such a method of using a lens, even if an inclination δ between the incident beam and the optical axis is constant, the incident angles $i_1$, $i'_1$ and the length of the light path A in the lens change depending on the incident position to the lens and the effective focal length $f_e$ changes.

Figure 5:
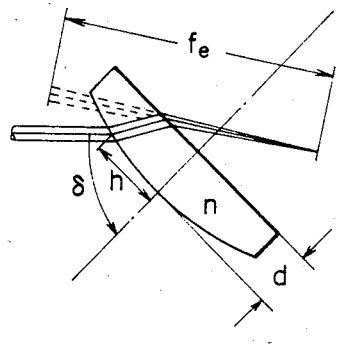

With respect to the flat convex lens shown in FIG. 5, FIG. 6 shows how the effective focal length $f_e$ changes in response to the change of the incident light δ of the beam and the incident position h from the optical axis. In the figure, the broken line indicates a line which connects a position providing the maximum effective focal length $f_{emax}$. The flat convex lens has $R_1=52.0$ mm, d=10 mm, n=1.52 and $R_2=\infty$ and the short axis focal length is f=100 mm. The light flux in FIG. 5 provides the maximum $f_e$ in case of δ=45°.

Figure 7:
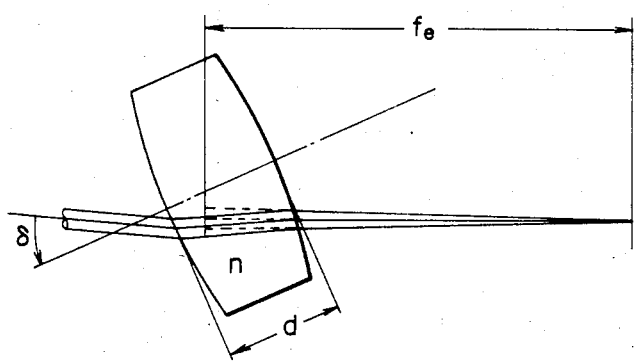
FIGS. 7 and 9 are respectively sectional views of a lens according to other embodiments.
Figure 8:
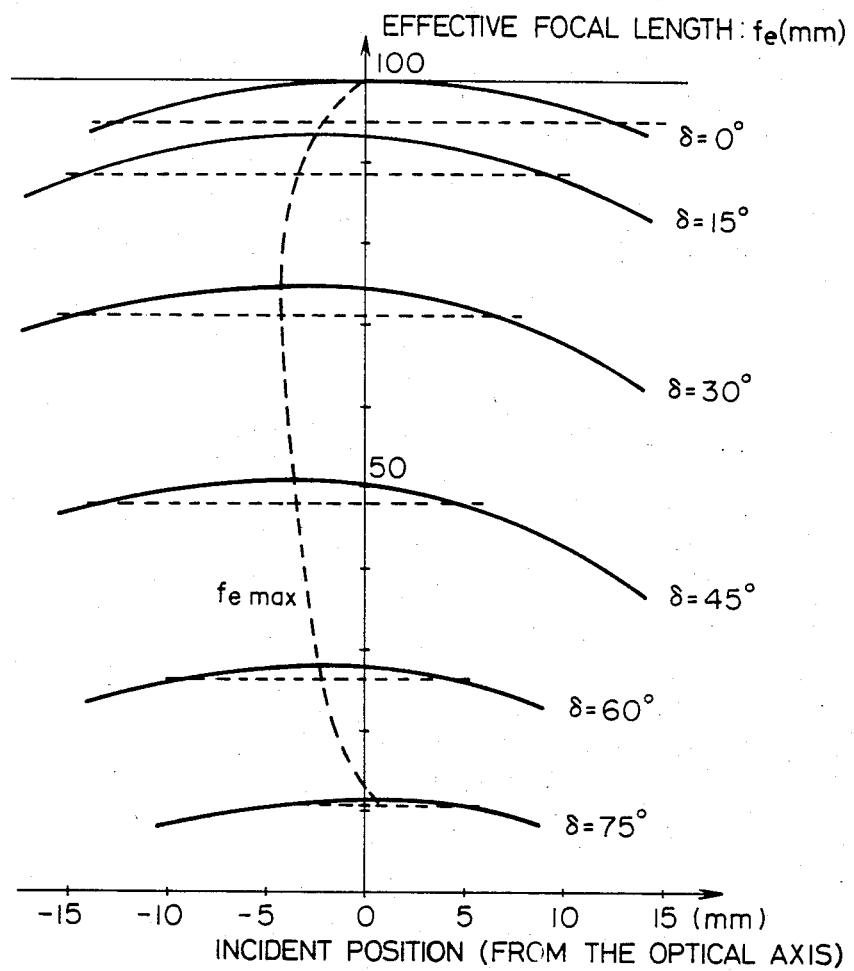
FIG. 8 is a curve showing the change of effective focal length in both the embodiments.

In a biconvex lens shown in FIG. 7, assuming that $R_1=100.459$, d=20, n=1.52, $R_2=-100.459$ and f=100, the change of the effective focal length according to the incident angle and the incident position is shown in FIG. 8. The light flux in FIG. 7 provides the $f_{emax}$ if δ=30°.

Figure 9:
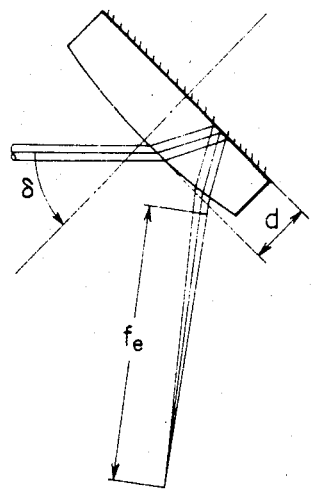

FIG. 9 shows an example of a so-called mirror lens in which the aforesaid biconvex lens is equally divided into two sections at a surface vertical to the optical axis, which surface is used as a mirror. Thus, the lens has $R_1=100.459$, d=10, n=1.52, $R_2=\infty$ (reflective surface) and f=100. The change of the effective focal length according to the incident angle and the incident position is the same as that of FIG. 8. The light flux in the figure provides $f_{emax}$ if δ=45°, and the effective focal length $f_e$ is 50.34.

In actual use, the incident beam can be made at the position of $f_{emax}$, and if the $f_{emax}$ is the center, variation of $f_e$ occurs due to the deviation of the incident position of the beam. It is noted that in the laser beam optical system, the allowable range of the spot diameter or the like is approximately 5%. However, since the spot diameter is nearly proportional to the $f_e$, the range of $f_e \geq 0.95\ f_{emax}$ can be used. The dotted lines in FIGS. 6 and 8 indicate the position which is reduced through 5% with respect to each $f_{emax}$.

Figure 10:
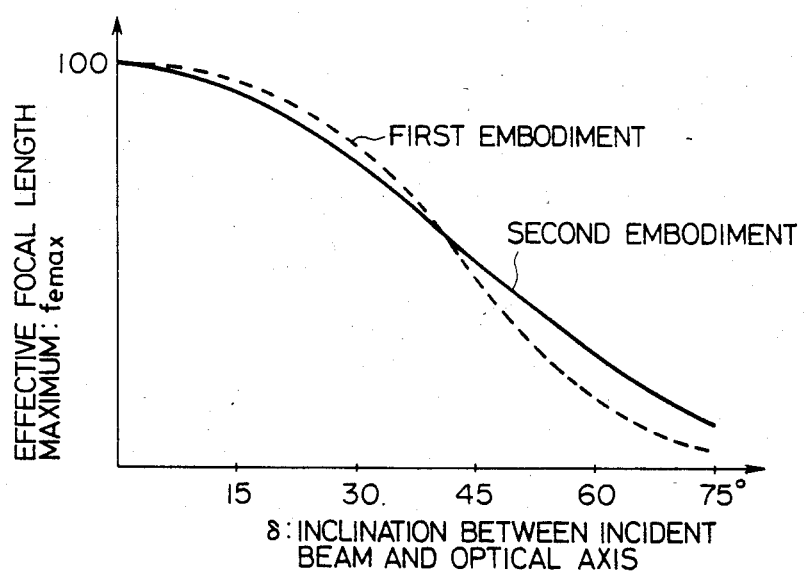
FIG. 10 is a curve showing the relation between an inclination of an incident beam and the maximum effective focal length.

FIG. 10 shows the change of $f_{emax}$ in connection with the inclination δ between the incident beam and the optical axis.

As described above, in accordance with the present invention, if the inclination δ between the incident beam and the optical axis is set to 45°, the lens has a focal length reduced approximately by a factor of two. Moreover, in the case the incident position h upon the first surface is minus as shown in FIG. 11, the lens can be divided into two sections by the optical axis, two of which may be used thus further enhancing the volume productivity.

Also, in laser beam printers or the like, the beam reflected by the lens surface is sometimes reflected again to form a flare or ghost on an image plane. Particularly, in the optical system including a reflective surface such as a rotary polyhedral mirror, the reflected light from the lens surface positioned behind said reflective surface is again reflected at the reflective surface, and therefore, an undesired effect results. In such a case, if the lens is arranged so that it is inclined with respect to the beam, as in the present invention, the reflective light is not returned to the original light path, and thus the occurrence of the ghost image or flare can be prevented.

That is, as shown in FIG. 12, the reflective light from the lens surface of the mirror lens 6 is not returned to the rotary polyhedral mirror and the stationary ghost image or flare will not occur. And, since the lens surface is directed downwardly, dust or toner will not be accumulated.

Further, in the case where a beam inclined through 30° to the optical axis as shown in FIG. 13 is incident upon the top of the same mirror lens 6, the effective focal length $f_e$ is 74.30. In this case, the incident angle of the beam upon the photosensitive body is 20.5°, and an effect is brought forth in which the ghost image due to the scattered reflective light from the surface of the photosensitive body is reduced.

As described above, in the present invention, a mirror for bending a light path and a second cylindrical lens can be replaced by a single mirror lens, and thus the invention offers four advantages simultaneously, i.e. that the number of parts is reduced, ghost image or flare is removed, the quality of copies is prevented from being lowered due to the accumulation of dust or the like, and the radius of curvature of the lens surface is increased to reduce the cost of manufacture of lenses.

What is claimed is:

1. In a photoscanning apparatus including a light beam source, a photodeflector, and an optical system including a cylindrical lens for placing a surface of said photodeflector and a photosensitive body in a geometrical, optically conjugated relation and providing a photodeflector light deflecting irregularity correcting function for the photodeflector, the improvement wherein said cylindrical lens has its optical axis inclined with respect to the incident beam such that its effective focal length is made shorter than its paraxial focal length by the inclination.

2. The improved photoscanning apparatus of claim 1, wherein said optical system includes a reflective surface located above the photosensitive body for reflecting a beam deflected from said photodeflector to expose and scan the photosensitive body from above.

3. The improved photoscanning apparatus of claim 2, wherein said cylindrical lens and said reflective surface are combined as a cylindrical mirror lens having a flat convex cylindrical lens and a plane side thereof as a reflective surface.

4. A laser beam optical system according to claim 1 comprising a lens arranged so that a beam is incident upon an incident distance from its optical axis in which an effective focal length $f_e$ is made maximum with respect to a given incident angle.

5. In a photoscanning apparatus including a light beam source, a photodeflector, and an optical system including a cylindrical lens for placing a surface of said photodeflector and a photosensitive body in a geometrical, optically conjugated relation and providing a photodeflector light deflecting irregularity correcting function for the photodeflector, the improvement wherein the optical system includes a reflective surface located above the photosensitive body for reflecting a beam deflected from said photodeflector to expose and scan the photosensitive body from above, and said cylindrical lens and said reflective surface are combined as a cylindrical mirror lens having a flat convex cylindrical lens and a plane side thereof as a reflective surface.

6. A laser beam optical system according to claim 5, wherein the cylindrical lens comprises a lens inclined with respect to a laser beam so that the laser beam is incident at an angle that the effective focal length $f_e$ may assume the maximum value.

7. A laser beam optical system according to claim 6, wherein the cylindrical lens is a half section in which it is divided from a whole line along the optical axis.

* * * * *